United States Patent
Vergnes et al.

(10) Patent No.: US 11,143,790 B2
(45) Date of Patent: Oct. 12, 2021

(54) MODELLING GEOLOGICAL FAULTS

(71) Applicant: TOTAL SA, Courbevoie (FR)

(72) Inventors: Clarisse Vergnes, Fabas (FR); Stephane Vignau, Pau (FR); Pierre Bergey, Paris la Defense (FR); Florent Lallier, Aberdeen (GB)

(73) Assignee: TOTAL SA, Courbevoie (FR)

( * ) Notice: Subject to any disclaimer, the term of this patent is extended or adjusted under 35 U.S.C. 154(b) by 236 days.

(21) Appl. No.: 16/338,304

(22) PCT Filed: Oct. 3, 2016

(86) PCT No.: PCT/EP2016/073547
§ 371 (c)(1),
(2) Date: Mar. 29, 2019

(87) PCT Pub. No.: WO2018/065027
PCT Pub. Date: Apr. 12, 2018

(65) Prior Publication Data
US 2020/0025971 A1   Jan. 23, 2020

(51) Int. Cl.
*G01V 99/00* (2009.01)
(52) U.S. Cl.
CPC ................. *G01V 99/005* (2013.01)
(58) Field of Classification Search
CPC .................................................. G01V 99/005
See application file for complete search history.

(56) References Cited

U.S. PATENT DOCUMENTS

2014/0214388 A1    7/2014  Gorell

OTHER PUBLICATIONS

International Search Report dated Apr. 19, 2017 in corresponding PCT Application No. PCT/EP2016/073547.
C. Vergnes et al., "Stochastic Simulations of Fault Relays and Induced Fault Transmissibility at Reservoir Scale—Method and Application," 77th Eage Conference & Exhibition 2015, Jun. 1, 2015, 6 pages.
T. Manzocchi et al., "Faults in conventional flow simulation models: a consideration of representational assumptions and geological uncertainties," Petroleum Geoscience, Feb. 1, 2018, vol. 14, No. 1, pp. 91-110.
T. Manzocchi et al., "Fault transmissibility multipliers for flow simulation models," Feb. 1, 1999, Petroleum Geoscience, vol. 5, No. 1, pp. 53-63.
T. Skar et al., "Fluid flow in faults modelling with the Athena reservoir simulator," First EAGE International Conference on Fault and Top Seals—What do we know and where do we go?, Sep. 8, 2003, 8 pages, http://earthdoc.eage.org/publication/download/?publication=16446.

*Primary Examiner* — Anthony Ho
(74) *Attorney, Agent, or Firm* — Hogan Lovells US LLP (57) ABSTRACT

To model hydrocarbon reservoirs more accurately, models of a geological volume using a three dimensional grid of cells populated with data from seismic studies are augmented by providing fine-grained stochastic models of the distribution of relays in fault zones and modelling the flow of hydrocarbons taking account the modelled relays.

14 Claims, 8 Drawing Sheets

MODELLING GEOLOGICAL FAULTS

CROSS REFERENCE TO RELATED APPLICATIONS

This application is a 35 U.S.C. 371 National Stage of International Application No. PCT/EP2016/073547, titled "MODELLING GEOLOGICAL FAULTS", filed Oct. 3, 2016, which is incorporated by reference herein in its entirety.

TECHNICAL FIELD

The present invention relates generally to the modelling of fluid flow in a geological volume comprising a geological fault. More specifically, the present invention relates to improvements in the handling of fluid flow across geological faults in fluid-flow models, offering the potential for improved hydrocarbon recovery.

BACKGROUND ART

Conventional modelling of fluid flow in a geological volume typically employs a 3D reservoir grid of cells representing volumes of dimensions of 50-100 m by 50-100 m in the horizontal plane and several meters in the vertical dimension. Such cells are generated based on data obtained using seismographic techniques.

A challenge associated with the modelling of fluid flow in a geological volume is the handling of fluid flow across geological faults. Faults can act as baffles, barriers or conduits to flow and accurate representation of faults is essential in order to accurately predict flow characteristics in a geological volume. This challenge is greatly exacerbated by the presence of so-called relays in the geological fault, which are small, geometrical structures in a fault zone capable of interconnecting layers in the geological volume either side of the fault. Such a relay is illustrated in FIGS. 1B and it is shown how material continues between the hanging wall and footwall sides of the fault. Despite their small size, relays greatly alter the flow propagation characteristics owing to their being capable of interconnecting layers in the geological volume either side of the fault. Yet the small size of relays in relation to the grid size can result in them being improperly considered in a flow analysis.

One approach to the handling of relays in flow models has been to retain a similar granularity of the grid but to attempt to adjust in the region of the faults the calculations based on empirical data obtained from studies of outcrop features. Unsurprisingly, such attempts have had only very limited success and tend to result in inaccurate prediction of flow.

Another approach to tackle the handling of relays in flow models has been to employ an extremely fine grid of cells, the relay structures then being represented and taken into account in the flow model. Yet this approach is typically infeasible owing to the resulting increase in computational requirements.

There is therefore a need for a technique of simulating the flow of fluids in geological volumes comprising a geological fault in which small scale relays can be accurately handled without greatly increasing the computational complexity of the flow model.

SUMMARY OF THE INVENTION

The invention is defined by the independent claim below. Dependent claims are directed to optional features and preferred embodiments.

There is disclosed a method of simulating fluid flow in a geological volume comprising a geological fault, the method comprising: generating a three dimensional grid of cells representative of the structure of the geological volume, the cells comprising base cells; classifying a plurality of base cells as fault cells corresponding to the fault in the geological volume; classifying one or more sets of cells as relay cell sets corresponding to assumed locations of relays within the fault in the geological volume; generating a three dimensional relay grid of relay sub-cells in the place of each relay cell set, the relay sub-cells of each relay grid being representative of a relay structure within the geological fault and having a finer grid-cell dimension than that of the cells of the relay cell set; determining transmissibilities between the relay sub-cells; and determining transmissibilities between the base cells based on the determined transmissibilities between the relay sub-cells.

It is to be understood that the determining of the transmissibilities between the base cells based on the determined transmissibilities between the relay sub-cells comprises assigning transmissibilities between non-interfacing base cell connections, i.e. base cells that do not share an interface, which would initially be understood to be zero owing to the lack of a shared interface.

The determining of the transmissibilities between the base cells may also comprise revising initially determined transmissibilities between interfacing cell connections, i.e. cells that do share an interface.

By classifying certain cells as relay cells and forming relay sub-cells in the place of the classified relay cells that are finer than the base cells, the structure and effects of relays can be modelled, increasing accuracy, without significantly increasing the computational and/or memory requirements of the model.

That the use of the relay sub-cells increases the accuracy of the model can be understood from the following. Without employing relay sub-cells a typical model would only calculate transmissibilities between cells that mate with one another, i.e. share an interface. But the small-scale relays provide flow propagation paths between layers in a geological fault in a volume and, as the structure of the small-scale relays that provide interconnections are not included in the coarse cells employed in the model, there will be unaccounted-for transmissibility between non-interfacing coarse cells in the model. By employing the finer relay sub-cells, and calculating the transmissibility between those relay sub-cells, it is possible to determine and account for the interconnections and otherwise missing values of transmissibility between the non-interfacing cells.

By facilitating isolating collections of cells of a reservoir grid corresponding to a fault zone, simulating stochastically the spatial distribution of relays within the isolated cells, simulating the geometrical parameters of the relays, assessing the dynamic effect of relays, incorporating these effects as new non-interfacing connections between the stacked cells, a coarse scale (reservoir) model can be adapted to reflect flow characteristics in flow simulations for the modelled geological context.

The method therefore can integrate stochastically small scale relays into known flow simulation techniques without requiring the preparation of more refined (i.e. higher resolution) reservoir grids. As a result, the effects of relays can be incorporated in flow simulations without requiring significant additional computational resource. Parameters that correspond to those understood by geologists can be employed.

The relay cell set may comprise a 2i×1j×Nk grid, wherein the i direction traverses the fault, the j direction runs substantially parallel along the length of the fault, and the k direction represents depth in the geological volume; and N represents any integer greater than or equal to 1. N may correspond to layers in the geological volume. Thus the relay cell set may comprise two cells either side of the fault being represented for each layer N.

The grid of relay sub-cells may comprise a nine-cell grid. The grid may comprise a 3i×3j×1k grid, or a 3i×3j×Nk grid, where N is the number of depth cells in the relay cell set.

The classification of the one or more relay cell sets may provide a spatially even distribution of relay cell sets along the direction of the length of the fault. This offers a computationally simplistic way to simulate the spread of relays across a fault.

The classification of the one or more relay cell sets may correspond with a random spatial distribution of relay cell sets along the direction of the length of the fault. This offers the potential to give a more accurate simulation of the positioning of relays across a fault.

A poisson point process may be employed in order to classify the one or more relay cell sets. It has been found that the use of this process facilitates a greatly increased accuracy of the simulation without significantly increasing computational requirements.

The number of classified relay cell sets may be determined based on the length of the fault represented by the fault cells. This offers a simplistic mechanism to apply a realistic number of classifications of relays that is scaled according to the lengths of faults.

The number of classified relay cell sets may be determined based on a random distribution. A random distribution taking predefined random distribution parameters may be employed. As there is a natural variation in the number of relays for a given fault length, the employing of a random distribution can be employed to increase the accuracy of the simulation by modelling this natural variation.

The fluid flow simulation may comprise multiple iterations of classifying the one or more sets of cells as relay cell sets and calculating the transmissibilities. Thus the steps from classifying one or more sets of cells up to determining the transmissibilities between the base cells may be iteratively repeated. By re-classifying the one or more sets of cells as relay cells, it is possible to take into account the natural variation in position and density of relays in a fault. The calculated transmissibilities from each iteration may be stored. The stored transmissibilities may be compared against a known transmissibility thereby to determine the most appropriate relay cell set classification. Alternatively the distribution of stored transmissibilities can be compared against a future development plan to assist in assessing the possibility of hydrocarbon recovery. The stored transmissibilities could be averaged to produce an average transmissibility. Thus the use of multiple iterations in this way offers the possibility to increase model accuracy and efficacy.

The classifying of the relay cell sets, generation of the relay grid of relay sub-cells and calculation of transmissibilities between relay sub-cells may be repeated for each fault identified in the geological volume.

There is a synergy between assigning the number of relays and applying the technique to multiple faults in a geological volume, as each new fault can have assigned a different number of relays taking into account the lengths of the fault and/or a random distribution, particularly where known statistical parameters are input to the random distribution, as a more accurate and yet computationally simply model can be provided.

The one or more relay shape parameters may be assigned to the relay cell sets and the calculation of the transmissibilities between the relay sub-cells may take into account the one or more relay shape parameters. The relay shape parameters may be assigned randomly according to known statistical distributions and/or predefined parameters. The vertical dimension of each sub-relay cell may be randomly assigned. These techniques offer the potential for increasing model accuracy.

The one or more relay shape parameters may include width, length, and vertical extent of the relay. It has been found that the model accuracy is sensitive to these parameters and thus employing them can improve model accuracy.

A relay cell set may comprise one or more depth cells in a vertical depth, i.e. k, direction. The number of depth cells for each relay cell set may be randomly assigned. Facilitating random variation in the depth of the relay cell sets may facilitate improved model accuracy by accounting for real-world variation in relay depths.

The cells may represent a vertical depth of between a few tens of centimetre to a couple of metres, and a horizontal length of greater than or equal to 100 metres. This ensures that computational complexity is low, owing to the use of a relatively coarse grid.

The classifying of the relay cell sets, generation of the relay grid of relay sub-cells and calculation of transmissibilities between relay sub-cells may be repeated for each fault identified in the geological volume. Thus the flow across multiple faults can be modelled with good accuracy and low computational requirements. There is a synergy between this step and many of the above features. For example, in the case where random numbers of faults or random positions of faults, or random fault parameters are applied, the model simulation accuracy can be improved by having the realisations of the fault classifications for each fault vary according to known statistical parameters, accurately reflecting the real life variance of relays across faults. Particularly in the case where the simulation is re-run adopting different relay classifications then, the model can provide a highly accurate simulation by presenting a distribution of results, which may optionally be averaged out the results over the different re-runs to produce a single value.

The one or more sets of cells classified as relay cell sets may be base cells. This offers computational simplicity.

The vertical faces of the fault cells may be vertically offset from the fault; and the fault cells may comprise cutted fault cells and non-cutted fault cells, the cutted fault cells having a reduced height as compared to the height of the non-cutted fault cells. The use of cutted fault cells having reduced height can compensate for the vertical offset between the vertical faces of the fault cells and the fault.

The method may comprise detecting hybrid-interface fault cells interfacing with both the fault and the cutted cells; and generating pseudo cells representing the fault cells in which the hybrid-interface fault cells are represented by pseudo cells having a height limited to the height of the portion of the hybrid-interface fault cells interfacing with the fault, wherein the one or more sets of cells classified as relay cell sets are pseudo cells.

The use of the pseudo cells incorporating cells representing hybrid-interface fault cells having heights limited by the height of the hybrid-interface fault cells interfacing with the fault facilitates compensation of the portion of the hybrid-interface fault cells interfacing with cutted cells. Thus a technique is provided for applying the techniques disclosed herein in respect of relay modelling to a stair step grid.

There is also disclosed the following configurations.

A method for simulating fluid flow in a geological volume, the method comprising: obtaining measurement data concerning the structure of the geological volume, the measurement data being structured in a three dimensional, 3D, grid of discrete cells, interfaces between said cells having associated dynamic connection parameters; identifying cells of the 3D grid that correspond to a fault zone in the geological volume and determining fault dimensions; setting a distribution of one or more relay features in the identified cells, the or each relay feature having a location set at random and a vertical extent randomly selected from a predetermined range; for each relay feature, randomly assigning a value for each of at least two shape parameters, said at least one shape parameter characterizing the relay feature; for each cell of the relay feature, generating a mini-model of the relay based on the at least two shape parameter, the mini-model comprising a plurality of sub-cells, and calculating associated dynamic connection parameters between the subcells, said dynamic connection parameters including transmissibility; upscaling the micromodel to provide an updated dynamic connection value representing the interface between the relay feature cell and a juxtaposed cell adjacent to the relay feature cell; and incorporating the updated dynamic connection value to the coarse model by non-interfacing cell connections.

Each cell may be a quadrilaterally-faced hexahedron (Cuboid), the lateral extension of the cuboid may be representative of greater than 50 m, e.g. approximately 100 m, and the vertical extension of the cuboid representative of between a few tens of centimetre to a few meters.

Each cell may have a square prism, the sides of the square each being greater than or equal to 100 m and the height orthogonal to the square being of about few meters.

The fault dimensions may include the throw determined at each cell.

The fault dimensions may include the approximated length of the fault zone.

A signal processing device implementing the method as described above.

It will be appreciated that features and aspects of the present disclosure described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF THE DRAWINGS

Embodiments of the present disclosure will now be described by way of example only, with reference to the accompanying drawings, where like parts are provided with corresponding reference numerals and in which.

DETAILED DESCRIPTION OF PREFERRED EMBODIMENTS

The detailed description set forth below in connection with the appended drawings is intended as a description of certain embodiments of the disclosure, and is not intended to represent the only forms in which the present disclosure may be practised. It is to be understood that the same or equivalent functions may be accomplished by different embodiments that are intended to be encompassed within the scope of the invention. In the drawings, like numerals are used to indicate like elements throughout. Furthermore, terms such as "comprises", "comprising", "contains" or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

The present disclosure relates to improvements in the modelling of small scale fault segmentation features (in particular relays) for use in geological fluid-flow models and hydrocarbon recovery.

Over millions of years, sediment from rivers and shallow seas have formed successive layers of sedimentary rock. Rocky material from sedimentary layers formed under similar conditions have similar petrophysical properties (such as permeability to fluids such as water or hydrocarbons). Originally these layers were locally horizontal; over time, geophysical phenomena cause the layers to deform.

Plate tectonics, glaciation, and other geophysical phenomena cause fractures (i.e. discontinuities) to form in the rocky layers of the Earth's lithosphere. Fractures that exhibit a significant displacement between two or more blocks are also referred to as "faults".

Faults can be classified in many ways. Where the displacement (i.e. the slip vector) is substantially horizontal, a fault may be termed a "strike-slip" fault. In cases where the displacement involves a significant vertical component, the fault may be referred to as a "dip-slip" fault. Dip-slip faults are further classified as "normal" or "reverse", depending upon the direction of the vertical component of displacement relative to the angle of the fault (also known as the "dip" of the fault). A non-zero dip means that one of two blocks lying either side of the fault underlies the other block. The term "normal" is applied to faults where the underlying block (also referred to as the "footwall" block or simply "footwall") is higher than the overlying block (referred to as the "hangingwall" or "hanging wall" block)—the hangingwall block has slipped down the slope of the dip relative to the footwall. In a reverse fault, the hangingwall block has moved upwards relative to the footwall block.

Figure 1A:
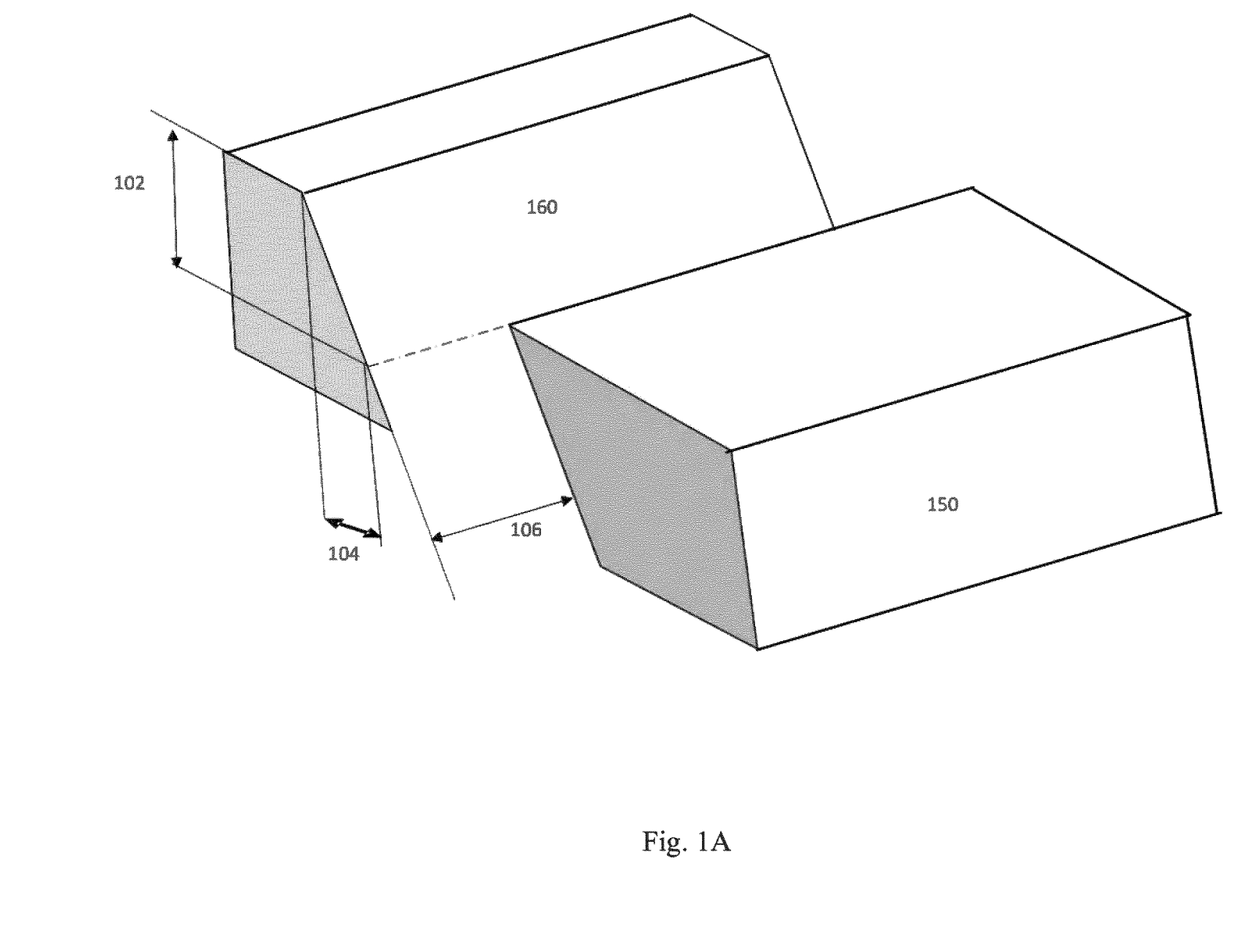
FIG. 1A shows an idealised normal fault.
Figure 1B:
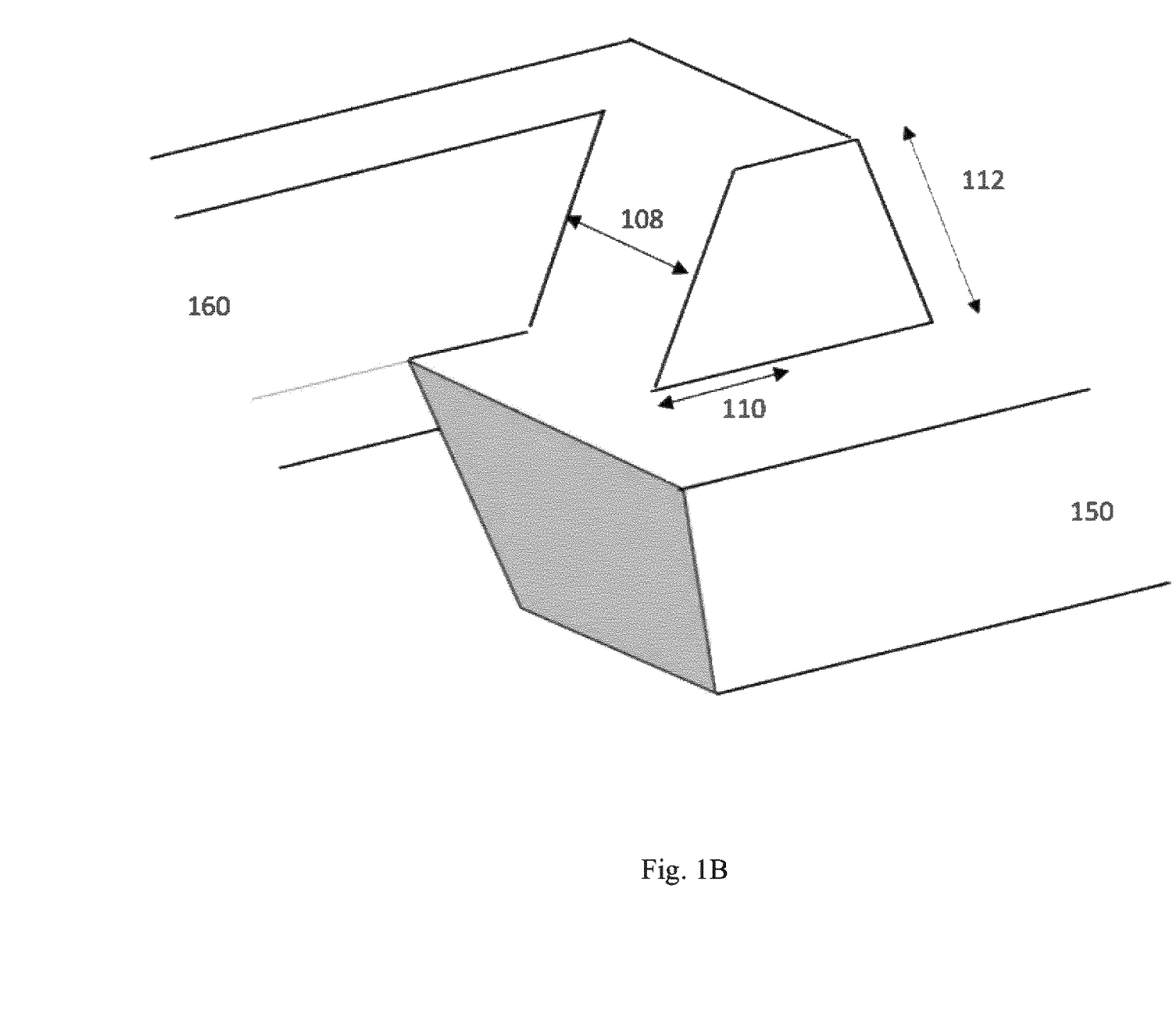
FIG. 1B shows an idealised normal fault with a relay.

FIG. 1A illustrates a normal fault with a hangingwall block 150 and a foot wall block 160.

By bringing a layer of substantially impermeable rock into a position opposite layers of porous and permeable rocks through which hydrocarbon resource may percolate, a fault can provide a barrier to fluid flow and a trap may be formed. The presence of faults may thus have a significant bearing on whether a particular geophysical feature will form a reservoir (and, thus, be a candidate for further investigation as a source of recoverable hydrocarbon). Structural traps capped by faults are referred to as "fault traps".

Exploring for and exploiting underground resources (such as underground oil, gas, shale, hydrothermal or artesian resources) has become increasingly sophisticated. Exploration sites are typically remote (often offshore and hundreds or thousands of meters below sea level) making some forms of geological measurement—such as the assay of outcrops—inconvenient.

Seismic measurement is often the only technique for obtaining reliable data on the geophysical structure of the underlying strata. Conventional imaging of geological features using seismographic techniques provides a set of 3D data with a horizontal resolution of 40 to 60 m (in general), used to generate a 3D reservoir grid of cells populated with measured parameters. The cells of such grids represent blocks having typical dimensions of 50-100 m by 50-100 m in the horizontal plane and few meters in the vertical. Large scale faults and relays can be represented in such grids, with the resolution of the seismic techniques allowing material from respective stratigraphic horizons to be distinguished.

With an understanding of the large scale geological features, it is possible to model, albeit crudely, the fluid flow and mechanical properties of the materials constituting the geological volume.

When modelling flow of underground resources associated with reservoirs (e.g. to identify suitable candidates for hydrocarbon extraction or to model likely behaviour during resource recovery), normal faults are typically treated as substantially planar membranes, which restrict or bar the flow of fluid resources depending upon the precise juxtaposition of layers or the inerrant property of the fault surface (clay smear for instance).

In practice, faults are often far more (petrophysically and geometrically) complex extended three dimensional (3D) structures and treating them as purely planar objects can lead to deficiencies in models and flow simulations based on those models. A fault zone may comprise a plurality of closely associated faults, which may run parallel to one another along part of the horizontal extent of the fault and then intersect. Such "segmented faults" require careful treatment when they are modelled.

Relays are geometrical structures in a fault zone capable of interconnecting layers in the geological volume either side of the fault.

A relay is "breached" when a connecting ramp, see FIG. 1B, is broken at one or more sites but the connecting material still provides a partial connection. A more completely breached relay may be referred to as a "lensed" relay as this forms a mezzanine surface having an approximately lens shape from overhead. The degree to which the relay zone is broken can be characterised by a number, represented on a scale from 0 (corresponding to an intact relay) to 1 (corresponding to a case where the sum of the throw of the breaching faults of a relay is equal to the throw of the fault at the position of the relay)—see Cartwright, Joseph A., Chris Mansfield, and Bruce Trudgill. "The growth of normal faults by segment linkage." Geological Society, London, Special Publications 99.1 (1996): 163-177.

A variety of geometrical parameters, i.e. throw, length, width, thickness describe faults and relays. These parameters are used to calculate connections between each side of the faults. The "throw" of a fault is the vertical distance separating two points; initially connected; on each side of a given fault—102 in FIG. 1A. The width of a relay ramp is the horizontal distance, perpendicular to the line of the fault, to which the ramp extends from the upper layer (i.e. the footwall in a normal fault)—108 in FIG. 1B. The length is the horizontal distance, parallel to the line of the fault, over which the ramp extends from the upper layer to the lower layer—110 in FIG. 1B.

It is possible to evaluate a number of relays per length unit and the statistical distribution of the geometrical parameters (throw, length, width, thickness).

Conventional imaging of geological features using seismographic techniques provides a data set including measured parameters used to build a 3D grid of discrete cells (when applied to the location of candidate oil traps, this grid may be referred to as a reservoir grid). The cells of such grids represent blocks (sometimes referred to as "control volumes") with typical dimensions of 50-100 m by 50-100 m in the horizontal plane and few meters in vertical. Large scale faults and relays can be represented in such grids, with the resolution of the seismic techniques allowing material from respective stratigraphic horizons to be distinguished. Fault zones appear in such large scale representations as sheets or membranes that transect the surrounding 3D stratigraphic structures. Each cell may be associated with a plurality of characteristic parameters (such as the rock permeability, etc.) the values of these characteristic parameters may be estimated or calculated. The use of a grid of cells allows the modelling of fluid flow through the represented geological features to be handled computationally.

It is difficult to image relays at scales smaller than the resolution of the seismic techniques (where "small scale" may be understood to be at a granularity representing a spatial dimension less than about 30 m) or smaller than the reservoir 3D grid cell (representing 100 m×100 m×few meters). Attempts have been made to correct flow simulations to account for fault segmentation using empirical data from studies of outcrop features with very limited success.

Relays at the smaller scale are however considered to have a significant impact on the flow properties across the fault. Relays have the potential to create both vertical and horizontal fluid connections over the fault and thus need to be accurately reflected in models used in flow simulations.

The cells of a reservoir grid that surround a given fault zone may be isolated (i.e. classified) to provide a model of the fault sheet. In the case that there is data available as to the locations of relays, such information can be employed in order to classify the cells corresponding to the fault zone. Without information about the precise locations of relays of smaller scale it is necessary to simulate where and estimate how many relays are likely to be present in the fault zone. The large scale model does nonetheless provide values of the throw at each cell and an approximate length of the fault.

Figure 1C:
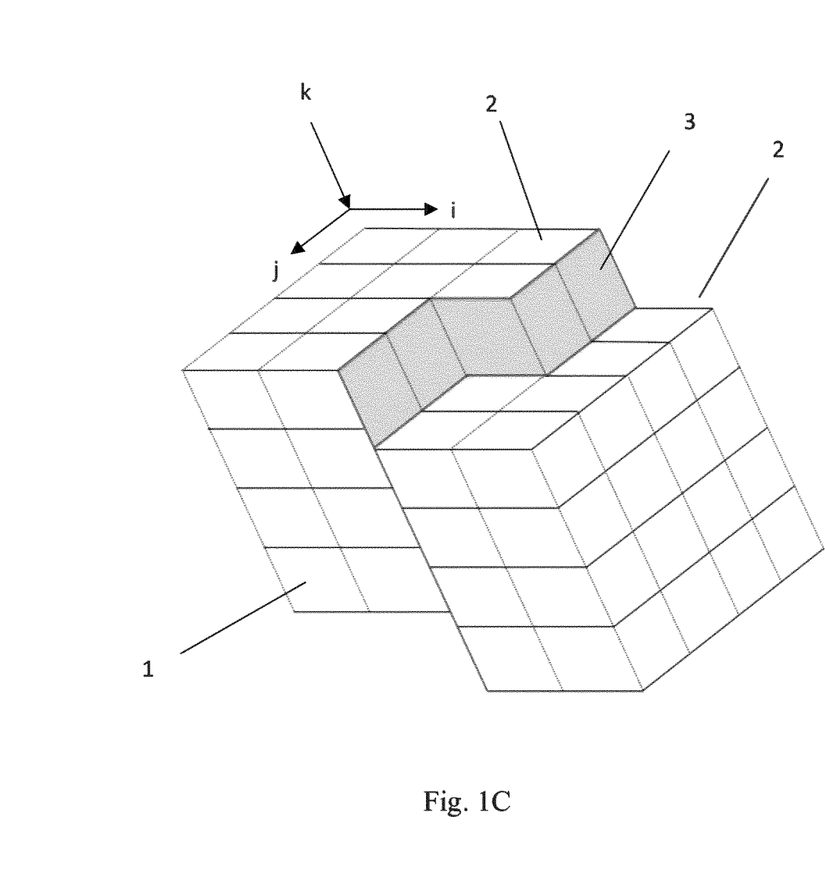
FIG. 1C shows the case in which a fault is aligned with vertical faces of a representational grid.
Figure 1D:
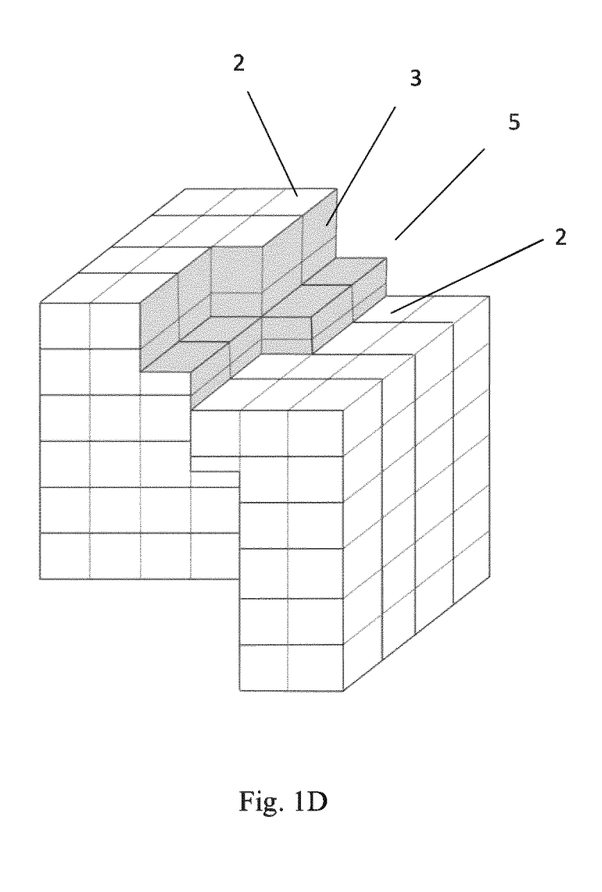
FIG. 1D shows the case in which a fault is offset from the vertical faces of a representational grid.

With reference to FIGS. 1C and 1D, reservoir grids may comprise cuboidal cells 1. Cells may be classified as fault cells 2 corresponding to the cells 1 interfacing with a fault being represented, the interfacing being represented in FIGS. 1C and 1D by shading. The horizontal faces of the cells may be aligned along the geological strata. Vertical faces 3 of the fault cells 2 may be aligned along the geological faults, see FIG. 1C, or may be vertically offset from the geological fault, see FIG. 1D. In the latter case, faults may be represented by employing vertical stairs 5 in the reservoir grid.

The present disclosure facilitates employing statistical and empirical information concerning relays to allow greater complexity to be represented in a model of the geographic context.

Figure 2:
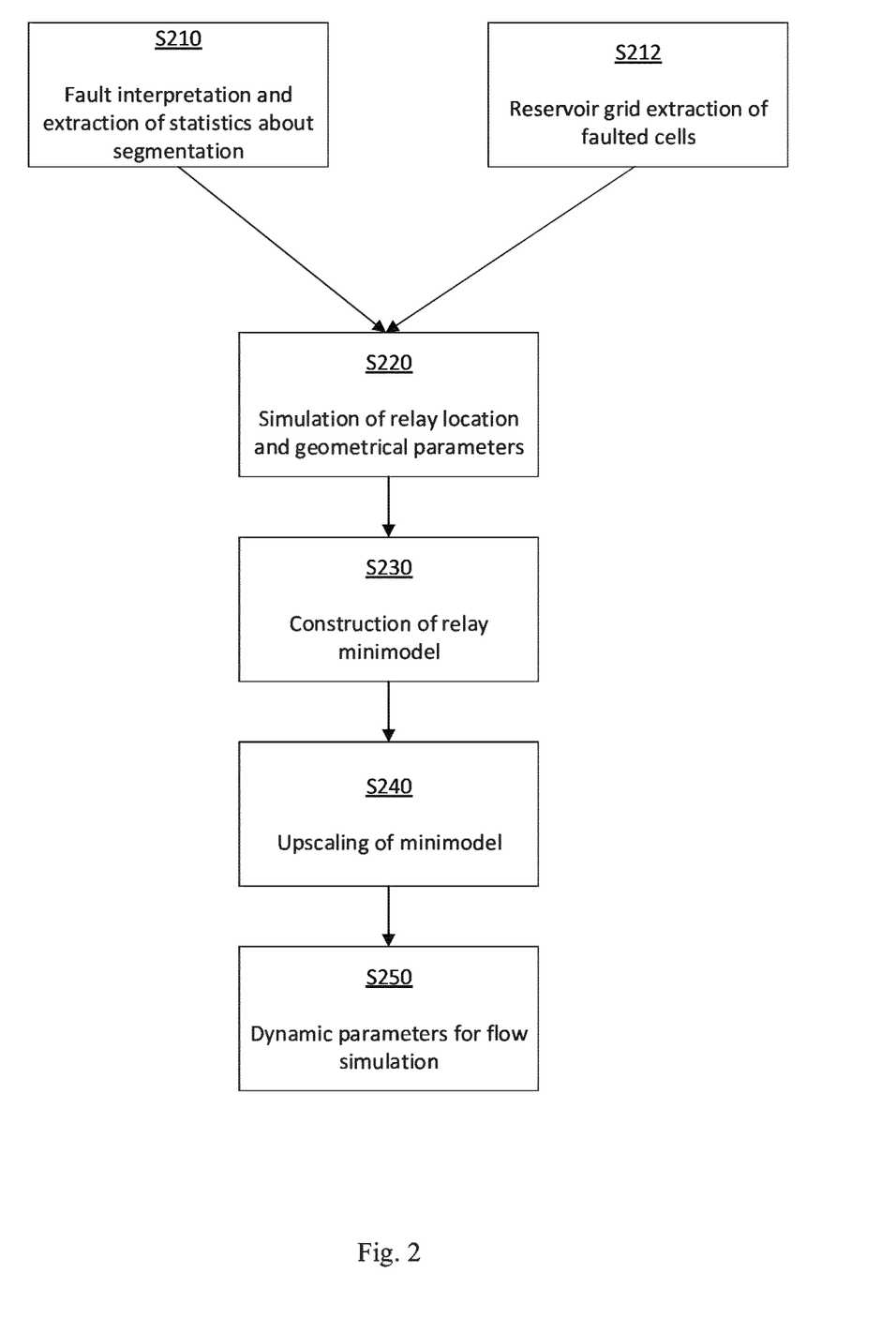
FIG. 2 shows an example of a sequence of functional blocks associated with employing a relay mini-model.

Certain functional blocks of an example of a sequence of functional blocks associated with employing a relay mini-model are shown in FIG. 2. Statistical information concerning the frequency of relays and correlations between parameters based on characteristics of faults that can be identified in the seismic plots used in reservoir grids can be identified (operation S210). A large scale 3D reservoir grid of discrete cells may be generated. Cells corresponding to fault zones within this 3D grid can be classified for further processing (operation S212).

Relays within a fault "membrane" can be treated as having a vertical extent. From the fault length, statistical values can be obtained, such as the number of relays in the fault and the range of geometrical parameters (as assessed by geologists from empirical studies of outcrops).

The number of relays to model may be determined using information about the length of the fault. For example, a relationship between the number of relays and the fault length may be assumed. In which case once the fault length in a model is determined, a number of relays can be estimated. Each relay can be associated with a vertical extension that is randomly determined from within a known range of vertical extensions for such relays.

Alternatively, known information about a geological volume to be modelled may be employed in order to pre-set the number of relays and their locations, and associated parameters.

A point process (the Poisson point process) may be employed to allow model relays to be placed in suitable statistically random (i.e. stochastic) locations throughout a model of a given fault zone that is represented by the classified fault cells of the reservoir grid.

Cells may be classified as fault cells 2 either side of a fault being represented. Thus either side of the fault the fault cells may be considered to form a two dimensional fault sheet. A poisson point process may thus be employed in order to classify fault cells as relay cell sets representing positions of relays assigned in the two dimensional fault sheet. The poisson point process may be employed to determine assumed locations of relays, the assumed locations being single cells on one side of the fault, and each of these single cells may be paired with their opposing cells on the other side of the fault, these pairs being classified as relay cell sets 10—see FIG. 3A.

Thus locations of relays are determined based on a poisson point or other process, giving 1i×1j×Nk grids corresponding to the assumed locations of the relays on one side of the fault, wherein the i direction traverses the fault, the j direction runs substantially parallel along the length of the fault, and the k direction represents depth in the geological volume; and N represents any integer greater than or equal to 1. N may correspond to layers in the geological volume. By combining each of these grids with their opposing cells on the other side of the fault, the relay cell sets 10 comprising 2i×1j×Nk grids and shown in FIG. 3A may be formed.

The vertical extent, N, of relays may be constant or may be randomly assigned, e.g. using a normal distribution.

The i, j and k cell referencing system described above may be assigned in addition to an existing cell referencing system, and there may be a geometrical rotation therebetween.

The point process allows a random position to be assigned for each relay in the fault sheet.

In a Poisson point process, the aim is to find the random number $N_K(S)$ of objects to put in a surface S in order to reach a target proportion $p_k$ and is given by a Poisson law. An example is:

$$P(N_K(S) = i) = e^{-\theta_K(S)} \frac{[\theta_K(S)]^i}{i!}$$

Where $\theta_K(S)$, the average number of objects in a surface S, is the density of the Poisson linked to the proportion $p_k$ and to the average surface $S_k$ of object of family k, as follows:

$$\theta_K(S) = -\frac{1}{S_k} \ln(1 - p_k)$$

The poisson point process can be used to further classify certain fault cells as relay cells representative of a relay structure in the fault (step S220). Thus the model of the fault zone can in this way be populated with randomly distributed relays of randomly determined vertical extent.

But the classification of fault cells as relay cells may be conducted by alternative means. For example, with a given number of relays assumed, the classification of fault cells as relay cells may be such that an even spacing of relay cells along the fault cells is achieved. Or a randomly distributed spacing may be employed.

Alternatively, known information about the numbers and locations of relays in a given fault may be incorporated into the model, the classification of the fault cells as relay cells being based on this information.

For each modelled relay of vertical extent, stochastic simulated values of the various characteristics of relays can be applied. Thus each modelled relay can be associated with a value for the width (that width value is simulated using a suitable distribution given by the geologist), a value of the length of the relay, a value describing the type of relay fault (0, 1 or 2) and a value of the throw associated to each of the relay fault. Correlation coefficients between the different parameters can be used in the process of simulation of this parameter. The statistical distributions of the parameter used in the simulation process may be input by a geologist as well as correlation coefficient between parameters.

Existing large scale flow simulations use the Darcy flow equation to express the relationship between respective cells including the relationship between cells that are not neighbours. The Darcy flow equation for a single phase, one dimensional flow in a homogenous medium is given as:

$$Q = \frac{K * NTG * A * \Delta P}{\mu * L}$$

Here, Q is the flow rate in m³/s (also referred to as the "discharge"); K is the rock permeability; NTG, the Net To Gross ratio (indicating the proportion of product in the medium); ρ, the fluid viscosity; A, the cross-sectional area; L, the length; and ΔP, the difference of pressure.

Transmissibility refers to a measure of capacity of a fluid to move between two cells.

Ordinarily, transmissibility refers to a measure of capacity of a fluid to move between two cells sharing a cell boundary (or inter-node connection) under pressure drop. More specifically a measure of the ability of a fluid to flow between two neighboring cells within a porous medium.

Transmissibility between cells that share an interface is a parameter of the Darcy flow equation.

$K_i$, A and L are static quantities for one cell i.

The transmissibility $T_i$ is given by:

$$Ti = \frac{Ki * NTGi * A}{L}$$

The transmissibility $T_{ij}$ between two grid cells i and j, which share an interface, is given by:

$$Tij = Cste \cdot \frac{1}{Tj + \frac{1}{Ti}}$$

Where Cste is the Darcy constant of 0.008572702 cp·m³·day⁻¹·bar⁻¹

Transmissibility thus depends on the permeability of the constituent rock.

It is apparent from the above that the transmissibility that is calculated between cells using conventional measurements of transmissibility based on the Darcy flow equation in a cell-based flow analysis will depend on the cross sectional area of interface between cells in the flow grid. Control volumes are formed and transmissibility between non-interfacing cells will be either not considered or set to zero. Yet with a coarse cell size, relay structures will not be taken into account in the model. Certain non-interfacing connections, will not have any transmissibility assigned therebetween, yet because of the relay structures that are, as it were, invisible to the model, assigning zero transmissibility will be incorrect as the relays result in a non-zero transmissibility between the non-mating coarse cells.

By employing the finer grid of relay sub-cells, the interfaces between non-mating coarse cells can be restored, and the transmissibilities between the coarse cells can be assigned.

A "mini-model" of the relay is constructed for each stack of cells in the grid where the stochastic model locates a relay of vertical extent (operation S230). Shape parameters including the characteristic values length, width, type of relay and throw of the relay faults are then associated with each cell of the mini-model FIG. 3 illustrates an example of creating a relay mini-model.

Figures 3A, 3B:
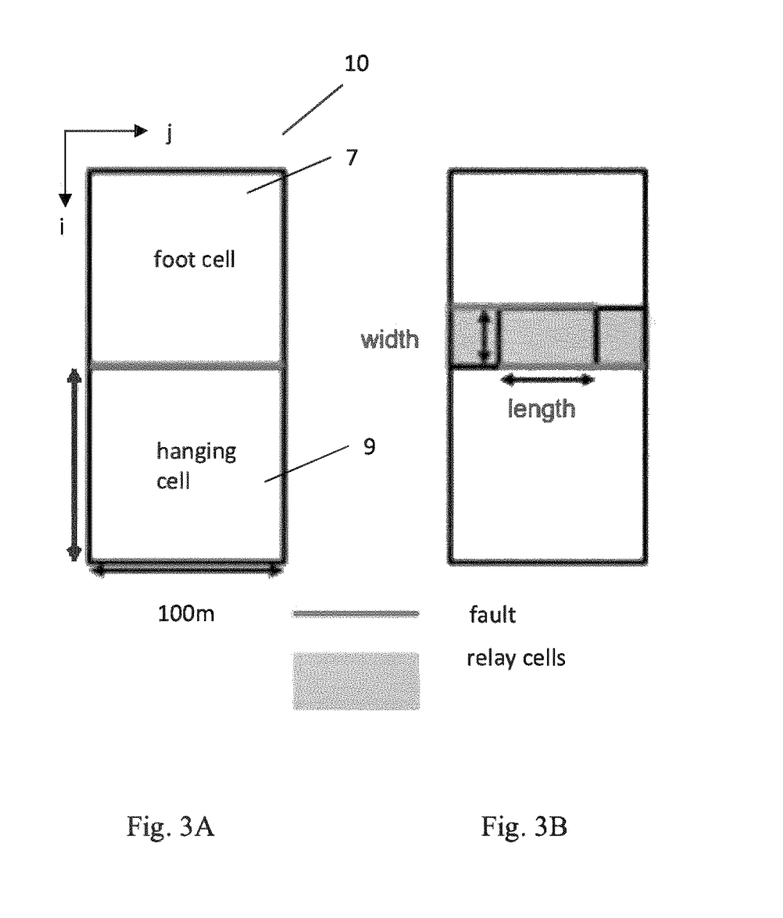
FIGS. 3A to 3D show an example in 2D of the use of a mini-model of a relay.

A relay cell set 10, shown in FIG. 3A, may comprise a foot cell 7 and a hanging cell 9 either side of a fault, corresponding to an assumed location of a relay. The view of FIG. 3A is a plan view in dimensions i and j, taking the corresponding dimensions shown in FIG. 1C. The relay cell set 10 may comprise one or more depth cells in the vertical, k, direction. Such depth cells may represent individual layers of the geological volume. Facilitating multiple depth cells for the relay cell sets may facilitate the provision of a more accurate model by offering greater flexibility in respect of the modelling of the relay structure.

FIG. 3B illustrates how a relay as shown in FIG. 1B may be modelled, the relay having a certain width and length, as represented by 108 in respect of the width and 110 in respect of the length in FIG. 1B.

Figure 3C:
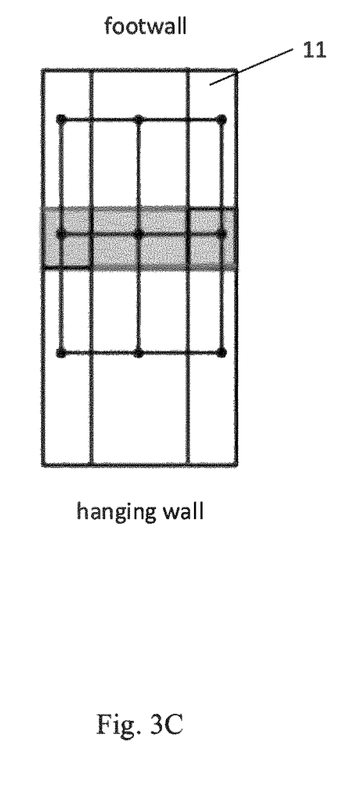
Figure 3D:
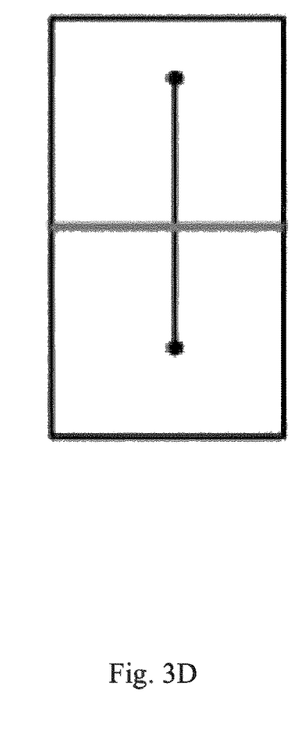
Figure 4A:
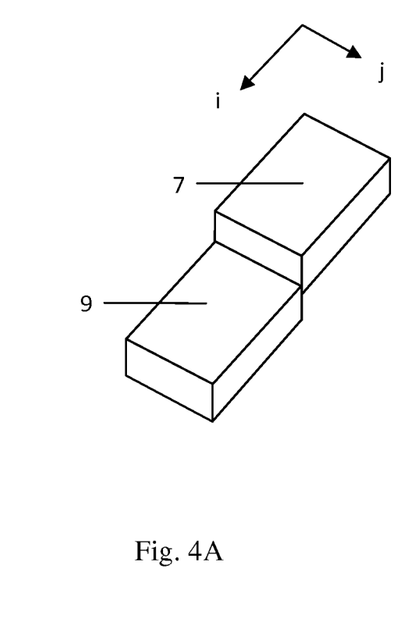
FIGS. 4A to 4D show an example in 3D of the use of a mini-model of a relay.
Figure 4B:
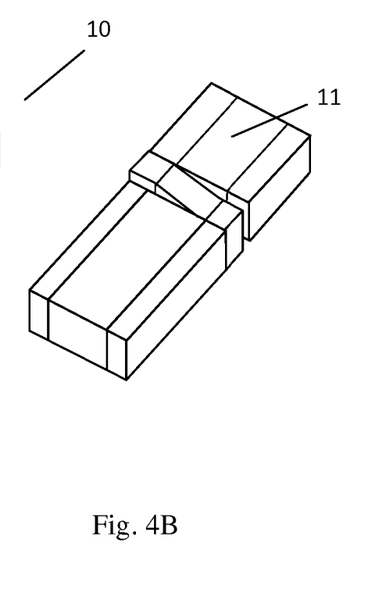
Figure 4C:
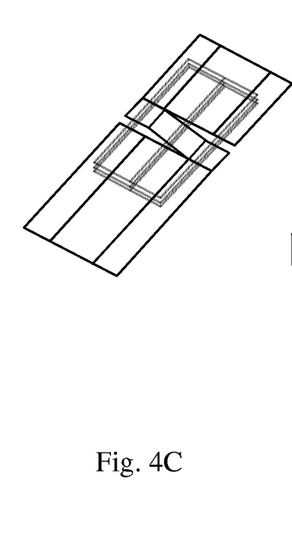
Figure 4D:
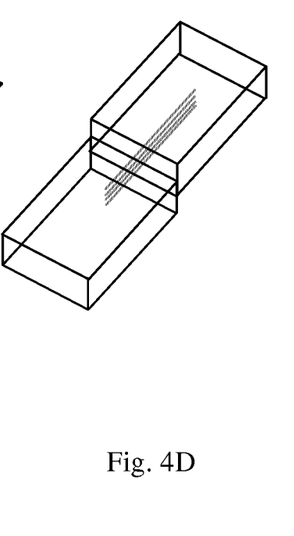

FIG. 3C shows the generation of a relay grid of relay sub-cells 11 in the place of the relay cell set 10. A relay grid may comprise nine relay sub-cells in a horizontal plane, i.e. i and j plane. There may be nine such relay sub-cells for each depth cell in the vertical, i.e. k, direction.

FIG. 3C also shows connections between relay sub-cells that may be employed to determine transmissibilities between the relay sub-cells. Interfaces between these relay sub-cells may give rise to transmissibilities between non-interfacing base cells that would not otherwise exist and/or revised transmissibilities between interfacing base cells.

The transmissibility of the sub-cells sharing an interface can be calculated (as is done between cells of the large scale grid). The network of nodes and edges of the mini-model (shown in FIG. 3C) can be simplified using method of renormalisation (initially from KING PR, 1989, THE USE OF RENORMALIZATION FOR CALCULATING EFFECTIVE PERMEABILITY, TRANSPORT IN POROUS MEDIA, Vol: 4, Pages: 37-58, ISSN: 0169-3913, and used for transmissibility upscaling by e.g. Karimi-Fard et al., 2004), in which the nodes and edges are replaced by an equivalent network of fewer node and edges (shown in FIG. 3D). As a result, the values of the transmissibility between respective sub-cells of the mini-model are condensed to a single effective transmissibility value between hanging cell 9 and foot cell 7. This renormalisation may be considered as an upscaling of the mini-model to allow it to be incorporated as an adjusted non interfacing cell connection in the flow simulation (operation S240).

FIG. 3D illustrates the determination of transmissilities between base cells 7 and 9 based on the transmissibilities determined between the relay sub-cells 11.

FIGS. 4A to 4D depict the same progression but in three dimensions.

By integrating stochastic modelling of fault segmentation, characterising the effect of small scale relays and incorporating the characterised effects as factors in the existing modelling of non-interfacing connections as indicated by the stochastic model of faults, the extracted "fault" cells of the 3D grid can be adapted to reflect flow characteristics in flow simulations for the modelled geological context (operation S250).

Figure 5A:
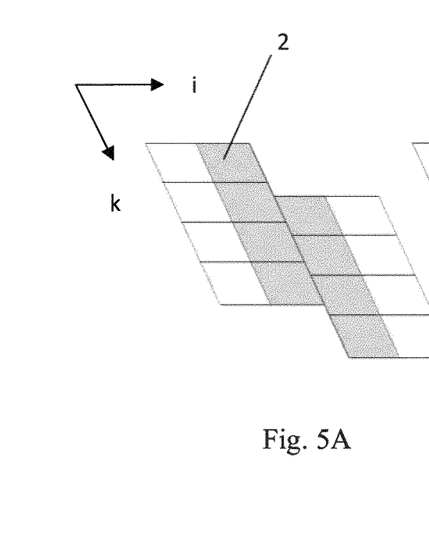
FIGS. 5A to 5C show an example of modelling relays along identified fault cells in the case in which a fault is aligned with vertical faces of the representational grid.
Figure 5B:
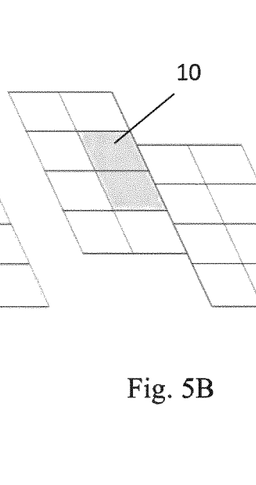
Figure 5C:
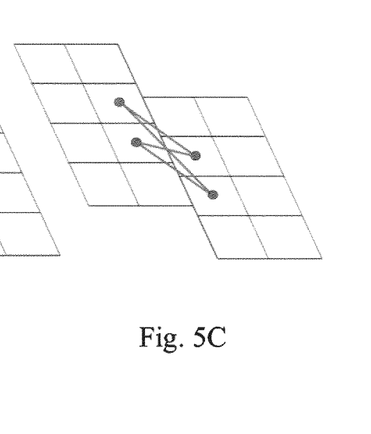

FIGS. 5A to 5C show an example method of determining transmissibilities associated with a relay across fault cells 2 in the case in which the vertical faces of the fault cells 2 are vertically aligned with the fault, as in the case of FIG. 1C.

In FIG. 5A, cells are classified as fault cells 2.

In FIG. 5B fault cells 2 are classified as relay cell sets 10.

In FIG. 5C transmissibilities associated with the relay between the fault cells 2 are determined.

FIGS. 6A to 6F show an example method of determining transmissibilities associated with a relay across fault cells 2 in the case in which the vertical faces of the fault cells 2 are vertically offset from a fault, as in the case of FIG. 1D.

Figure 6A:
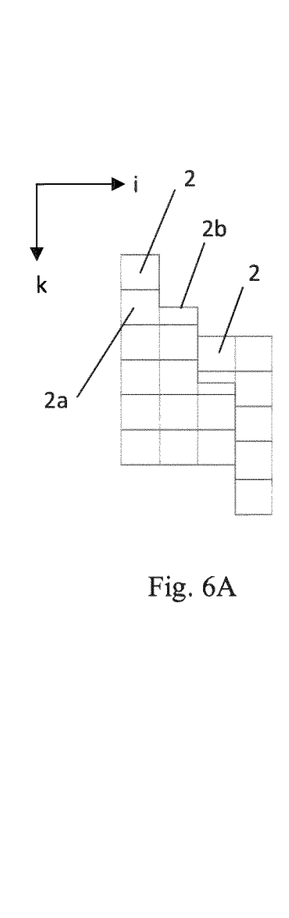
FIGS. 6A to 6F show an example of modelling relays along identified fault cells in the case in which a fault is offset from the vertical faces of the representational grid.

In FIG. 6A, cells either side of a fault may be classified as fault cells 2. The fault cells comprise non-cutted fault cells 2a and cutted fault cells 2b having a reduced height as compared to the non-cutted fault cells 2a.

Such a cell composition arises from so-called stair step representation, which is employed in order to represent the fault notwithstanding the vertical offset between the vertical faces of the fault cells 2 and the fault, as shown in FIG. 1D. The use of the cutted fault cells 2*b* presents a challenge in respect of the modelling of transmissibility across the fault; without special measures being employed incorrect transmissibility would be determined owing to the sharing of an interface of certain fault cells with both the fault and the non-cutted fault cells.

Figure 6B:
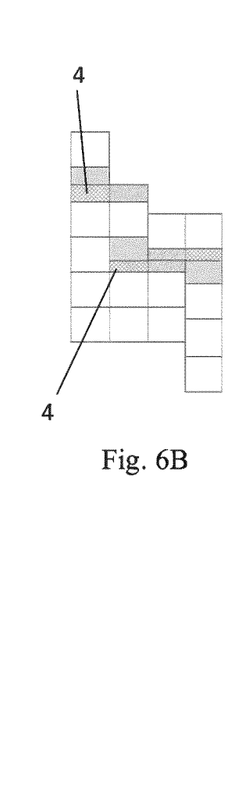

In FIG. 6B, fault cells 2 sharing an interface with both the fault and the cutted fault cells 2*b* are detected and classified as hybrid-interface fault cells 4.

Figure 6C:
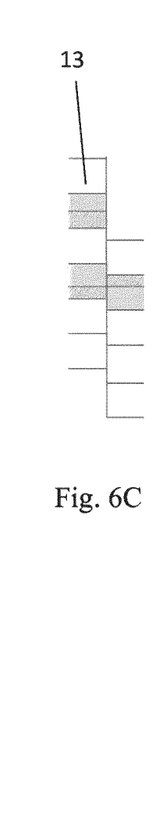

In FIG. 6C, pseudo cells 13 are formed representing the fault cells 2 either side of the fault being represented. These pseudo cells 13 correspond with the fault cells 2, and the hybrid-interface fault cells 4 have been replaced with pseudo cells having a height limited by the height of the hybrid-interface fault cells 4 interfacing with the fault. Thus the height of the hybrid-interface fault cells 4 have been reduced in the replacement pseudo cells 13 thereby to compensate for the portion of the hybrid-interface fault cells 4 not interfacing with the fault, but rather interfacing with the non-cutted fault cells. The heights of the pseudo cells 13 representing the non-cutted fault cells 2*a* may be the same as the heights of the non-cutted fault cells 2*a* being represented. As shown in FIG. 6C, the pseudo cells 13 can now be vertically aligned representing flow across the fault in a horizontal direction.

Figure 6D:
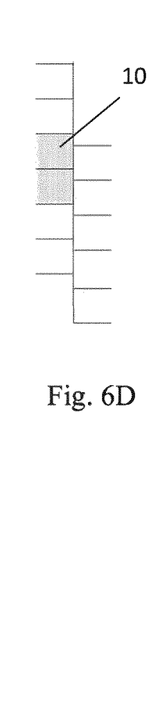

In FIG. 6D, certain fault cells are classified as relay cell sets 10. Alternatively, certain pseudo cells 13 may be classified as relay cell sets 10.

Figure 6E:
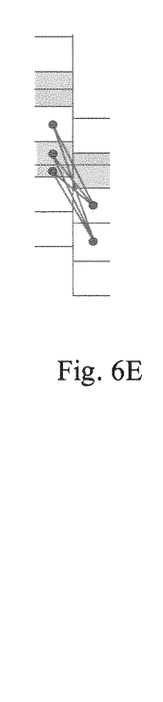

In FIG. 6E transmissibilities between pseudo cells 13 are determined.

Figure 6F:
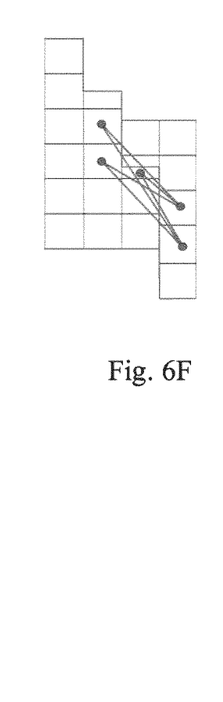

In FIG. 6F transmissibilities between fault cells 2 are determined based on the determined transmissibilities between the pseudo cells 13.

The description of preferred embodiments above has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the scope of the present disclosure as defined by the appended claims.

The invention claimed is:

1. A method of simulating fluid flow in a geological volume comprising a geological fault, the method comprising:
generating a three dimensional grid of cells representative of the structure of the geological volume, the cells comprising base cells;
classifying a plurality of base cells as fault cells corresponding to the fault in the geological volume;
classifying one or more sets of fault cells as relay cell sets corresponding to assumed locations of relays within the fault in the geological volume;
generating a three dimensional relay grid of relay sub-cells in the place of each relay cell set, the relay sub-cells of each relay grid being representative of a relay structure within the geological fault and having a finer grid-cell dimension than that of the cells of the relay cell set;
determining transmissibilities between the relay sub-cells;
determining transmissibilities between the relay cell sets based on the determined transmissibilities between the relay sub-cells, and determining transmissibilities between the base cells based on the determined transmissibilities between the relay sub-cells, wherein the classification of the one or more relay cell sets provides a spatially even distribution of relay cell sets along the direction of the length of the fault.

2. The method according to claim 1, wherein the classification of the one or more relay cell sets corresponds to a random spatial distribution of relay cell sets along the direction of the length of the fault.

3. The method according to claim 1, wherein a poisson point process is employed in order to classify the one or more relay cell sets.

4. The method according to claim 1, wherein the number of classified relay cell sets is determined based on the length of the fault represented by the fault cells.

5. The method according to claim 1, wherein the fluid flow is simulated over multiple iterations, each new iteration comprising reclassifying one or more sets of cells as relay cell sets.

6. The method according to claim 1, wherein one or more relay shape parameters are assigned to the relay cell sets and the calculation of the transmissibilities between the relay sub-cells takes into account the one or more relay shape parameters.

7. The method according to claim 6, wherein the one or more relay shape parameters include width, length, and vertical extent of the relay.

8. The method according to claim 1, wherein the classifying of the relay cell sets, generation of the relay grid of relay sub-cells and calculation of transmissibilities between relay sub-cells is repeated for each fault identified in the geological volume.

9. The method according to claim 1, wherein the one or more sets of cells classified as relay cell sets are base cells.

10. The method according to claim 1, wherein:
the vertical faces of the fault cells are vertically offset from the fault; and
the fault cells comprise cutted fault cells and non-cutted fault cells, the cutted fault cells having a reduced height as compared to the height of the non-cutted fault cells.

11. A processing device arranged to implement the method as claimed in claim 1.

12. A computer readable medium comprising computer program instructions that when executed on a processor perform the method according to claim 1.

13. A method of simulating fluid flow in a geological volume comprising a geological fault, the method comprising:
generating a three dimensional grid of cells representative of the structure of the geological volume, the cells comprising base cells;
classifying a plurality of base cells as fault cells corresponding to the fault in the geological volume;
classifying one or more sets of fault cells as relay cell sets corresponding to assumed locations of relays within the fault in the geological volume;
generating a three dimensional relay grid of relay sub-cells in the place of each relay cell set, the relay sub-cells of each relay grid being representative of a relay structure within the geological fault and having a finer grid-cell dimension than that of the cells of the relay cell set;
determining transmissibilities between the relay sub-cells;

determining transmissibilities between the relay cell sets based on the determined transmissibilities between the relay sub-cells, and determining transmissibilities between the base cells based on the determined transmissibilities between the relay sub, wherein the number of classified relay cell sets is determined based on a random distribution.

14. A method of simulating fluid flow in a geological volume comprising a geological fault, the method comprising:

generating a three dimensional grid of cells representative of the structure of the geological volume, the cells comprising base cells;

classifying a plurality of base cells as fault cells corresponding to the fault in the geological volume;

classifying one or more sets of the fault cells as relay cell sets corresponding to assumed locations of relays within the fault in the geological volume;

generating a three dimensional relay grid of relay sub-cells in the place of each relay cell set, the relay sub-cells of each relay grid being representative of a relay structure within the geological fault and having a finer grid-cell dimension than that of the cells of the relay cell set;

determining transmissibilities between the relay sub-cells;

determining transmissibilities between the relay cell sets based on the determined transmissibilities between the relay sub-cells, and determining transmissibilities between the base cells based on the determined transmissibilities between the relay sub-cells; and wherein:

the vertical faces of the fault cells are vertically offset from the fault; and the fault cells comprise cutted fault cells and non-cutted fault cells, the cutted fault cells having a reduced height as compared to the height of the non-cutted fault cells, the method further comprising:

detecting hybrid-interface fault cells interfacing with both the fault and the cutted cells;

generating pseudo fault cells representing the fault cells in which the hybrid-interface fault cells are represented by pseudo fault cells having a height limited to the height of the portion of the hybrid-interface fault cells interfacing with the fault; and the one or more sets of cells classified as relay cell sets are pseudo fault cells.

* * * * *